Dec. 1, 1942.  S. B. GRISCOM ET AL  2,303,451
PEAK DEMAND METER
Filed Jan. 9, 1941
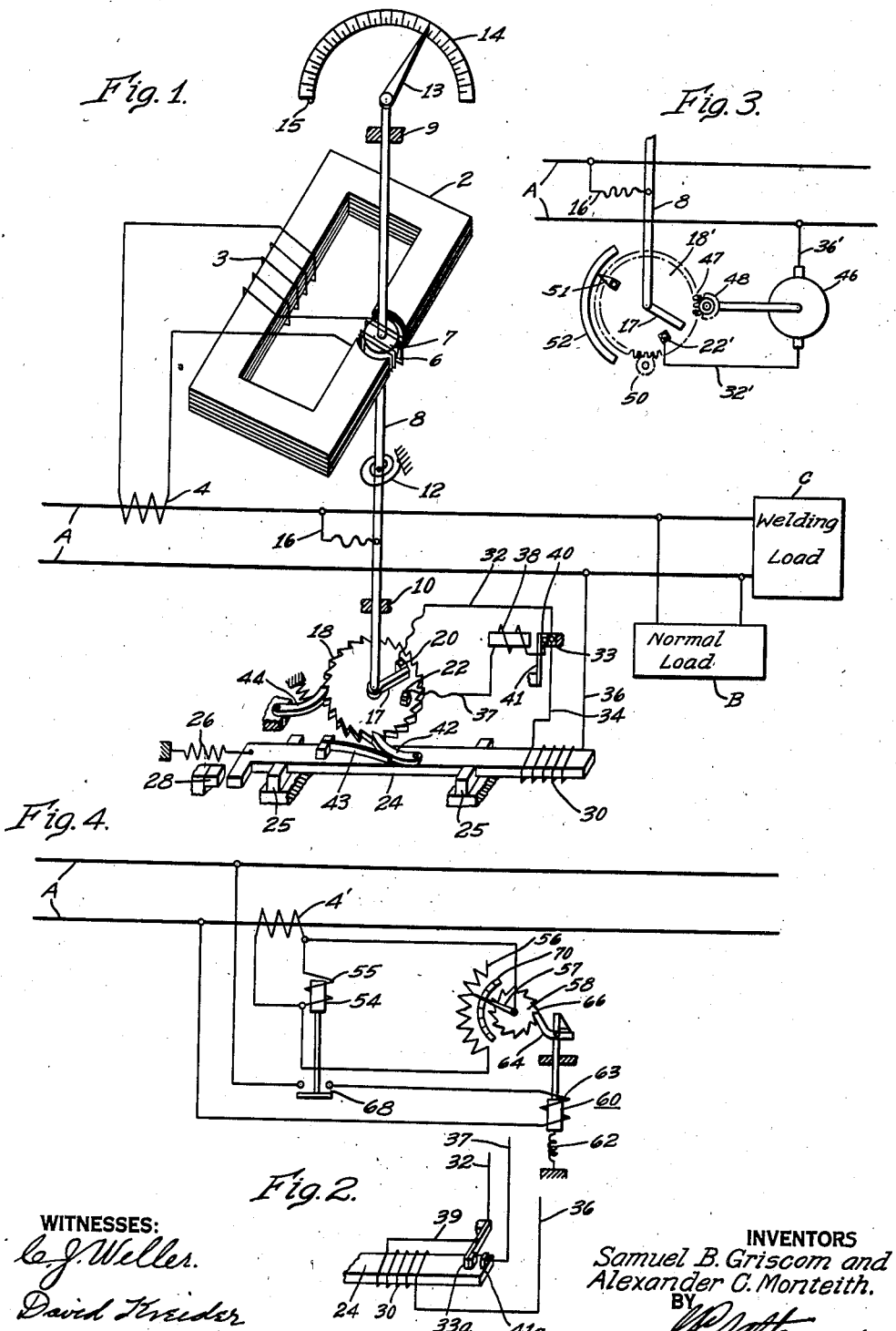
WITNESSES:
C. J. Weller.
David Kreider.
INVENTORS
Samuel B. Griscom and
Alexander C. Monteith.
BY
ATTORNEY Patented Dec. 1, 1942

2,303,451

UNITED STATES PATENT OFFICE 2,303,451

PEAK DEMAND METER

Samuel B. Griscom and Alexander C. Monteith, Wilkinsburg, Pa., assignors to Westinghouse Electric & Manufacturing Company, East Pittsburgh, Pa., a corporation of Pennsylvania Application January 9, 1941, Serial No. 373,858

13 Claims. (Cl. 171—95)

The present invention relates to demand meters, and it has particular relation to a demand meter for measuring the peak demand of electrical circuits where loads of large magnitude are likely to occur for very short periods of time.

With certain types of loads, such as welders, arc furnaces, etc., the peak load drawn from the supply system may be 100 or more times the average load due to the very short duration of such demands. A welding load, for example, may require an extremely large current, but since each of these current demands last for only a couple of cycles of the supply current, the actual power consumed is relatively small.

Loads of this type make it necessary for the power company to provide standby generating apparatus of relatively large capacity and employ more expensive transmission line equipment to prevent substantial voltage drops and similar annoyances to its other customers. Obviously, the customer whose peak demand requirements make this extra expenditure necessary should properly be charged with it instead of having the expense divided with the customers having more uniform loads.

The usual type of metering equipment, such as watthour meters and maximum demand wattmeters do not provide accurate indications of peak demands of the type mentioned above because the first, for example, are of the integrating type, while the second normally operate over too great a demand period to be of any value. While special meters for this problem have been developed in which the measuring device itself acts to furnish an operating adjusting force, the present invention relates to such a meter in which the accuracy of the measuring device is considerably greater since it merely controls the application of the adjusting force and does not supply it.

It is, accordingly, an object of the present invention to provide a novel and improved device for measuring the peak maximum demand of an electrical circuit.

It is another object of the invention to provide a peak demand meter in which a measuring device controls an operating device for increasing the calibration of the measuring device.

A further object of the invention is to provide a maximum peak demand meter in which a current measuring device controls the energization of an operating device which, in turn, acts to increase the current required for a subsequent operation.

Other objects and advantages of the invention will appear from the following detailed description taken in conjunction with the accompanying drawing, in which like reference characters indicate like parts.

In the drawing,

Figure 1 is a schematic showing of an embodiment of the invention with parts thereof shown in perspective;

Fig. 2 is a perspective view of a modification of a portion of the apparatus shown in Fig. 1;

Fig. 3 is a view similar to Fig. 1 of a modified type of operating mechanism for use with the measuring apparatus shown in Fig. 1; and Fig. 4 is a schematic diagram of a modified form of the invention.

Referring to Fig. 1, a pair of electrical supply conductors A are shown supplying a load B which is of the usual type requiring a rather steady amount of power, while a welding load indicated at C is also supplied thereby.

The peak demand device includes an iron core 2 around which is wound a magnetizing coil 3 which is connected in series with the secondary winding of a current transformer 4 and another coil 6 disposed around a movable armature 7 to rotate therewith. The transformer winding 4 is connected to be energized in accordance with the current flowing in one of the conductors A, although it is possible that the coils 3 and 6 may be connected directly in the supply circuit, if desired. The movable armature 7 is disposed within the magnetic circuit of the core 2 and mounted on a shaft 8 to rotate it in a clockwise direction to an extent proportional to the current flowing in the supply conductors A. This shaft is mounted within supporting members or bearings 9 and 10 and is biased to a zero position by means of a helical spring indicated at 12. To the upper end of the shaft is attached a pointer 13 for cooperation with an indicating scale 14. A stop pin 15 may be disposed at the zero point on the scale, if desired.

The shaft 8 is electrically connected to the upper of the conductors A as by means of a conductor 16, and carries at its lower end a contact member 17 which is adapted to rotate therewith. Also disposed at the lower end of the shaft is a toothed disk member or ratchet wheel 18 which is free to rotate relative to the shaft and carries a pair of spaced contacts 20 and 22. These contacts are insulated from the ratchet wheel 18 and are disposed at the same radial distance from its center.

A magnetic bar or armature 24 is disposed in bearing members 25 adjacent the ratchet wheel 18 and is biased by means of a spring 26 toward a stop member 28 at one end thereof. An electromagnet winding 30 is disposed about the other end of the armature 24 to attract it away from the stop 28 in opposition to the spring 26 when operatively energized.

The contact 20 is electrically connected to one end of the electromagnet 30 through a circuit comprising a conductor 32, a stationary secondary contact 33, and a conductor 34, while the other end of the electromagnet is connected to the lower supply conductor A by means of another conductor 36. The contact member 22 is electrically connected to the secondary contact 33 by means of a circuit comprising a conductor 37, an electrical solenoid 38, and another secondary contact 40. The secondary contact 40 is disposed on a flexible armature member 41 which is normally biased to engage the contact 33 but separates therefrom upon energization of a solenoid 38.

Disposed on the armature 24 to move therewith is a pawl member 42 which is biased against the ratchet wheel 18 by means of a spring 43 to cause movement of the ratchet wheel in a clockwise direction upon each movement of the armature towards the left. On the return of the armature to the right the pawl 42 slides freely over the ratchet edge of the wheel 18 and causes no movement of it because of a stop pawl indicated at 44.

With the apparatus connected as just described, it will be evident that the movable contact 17 will normally be in engagement with the adjustable contact member 20 when a normal load below a particular current value is on the supply circuit A. In this condition the electrical solenoid 30 is energized from the supply circuit A by the following circuit: Upper conductor A, conductor 16, rotatable shaft 8, movable contact member 17, contact 20, conductor 32, secondary contact 33, conductor 34, electromagnet 30, and conductor 36 to lower conductor A. With the electromagnet thus energized, the armature 24 will be attracted to the right against the bias of the spring 26. Upon the current in the supply circuit A reaching a value exceeding that represented by the movable contact 17 when in engagement with the contact 20, this contact 17 will be rotatably displaced in a clockwise direction to break its engagement with the contact 20. Upon this occurrence, the electromagnet 30 is immediately deenergized to permit the armature 24 to move to the left against the stop 28. During this movement, the ratchet wheel 18 is rotated in a clockwise direction the distance of a single notch. If the current increase is momentary, the member 17 will thereafter return to engagement with the contact 20 which is now at an advanced position. Consequently, a current impulse of greater magnitude is necessary to cause a subsequent separation of these contacts. It will thus appear that if a meter is originally set with the ratchet wheel 18 at a low calibration, it will be rotated by each current impulse higher than that previously applied until over a metering period its position actually represents the maximum peak demand which has occurred. The position of the pointer 13 on the dial 14 will give a convenient indication of this position.

If, however, the load upon the supply circuit immediately reaches a steady value such that the movable contact 17 is not in engagement with the contact 20, some additional means is required to cause actuation of the ratchet wheel, and it is for this reason that the contact 22 and its control circuit are provided. At the time the contact 17 engages the adjustable contact 22, the electromagnet 30 will be deenergized, and the armature 24 will be in position against the stop 28. Engagement of the contacts 17 and 22, however, closes a circuit from the upper conductor A through conductor 16, shaft 8, contact 17, contact 22, conductor 37, solenoid 38, contact 40, contact 33, conductor 34, electromagnet 30, conductor 36, and lower supply conductor A to energize the electromagnet 30. Such energization of the electromagnet brings the armature 24 back to its attracted position. This energizing circuit for the electromagnet 30 also energizes the solenoid 38 which attracts the armature 41 to open the circuit, thus deenergizing the electromagnet 30 and permitting the armature 24 to return to the left and advance the ratchet wheel one notch. Since the solenoid 38 and armature 41 act in the nature of a repeater relay, the electromagnet 30 will thus be alternately energized and deenergized as long as the contacts 17 and 22 are in engagement and the operating time of the armatures 24 and 41 are coordinated with this end in view. In this manner, the ratchet wheel 18 will subsequently be advanced to the position in which the contacts 17 and 20 are in engagement. From this latter position the device will act in the manner previously described to advance the ratchet wheel further upon the occurrence of a load current of progressively greater magnitude only.

In the modified form of the invention shown in Fig. 2, the solenoid 38 and armature 41 are dispensed with, and instead the repeater notching action is obtained by means of a stationary contact 33a cooperating with a movable contact 41a which is disposed on the armature 24. The contact 41a is connected to the contact 22 by means of a conductor 37 and the contact 33a is connected to the contact 20 by means of a conductor 32. A conductor 39 electrically connects one end of electromagnet 30 to contact 33a while the other end thereof is connected by a conductor 36 to the lower supply conductor A. The position of the contact 33a is such that it is engaged by the contact 41a when the armature 24 is in position against the stop 28 as is so when the electromagnet 30 is unenergized. It will be evident that the parts may be proportioned so that the operation of this modification will be the same as that previously described, except that the armature 24 itself will act to make and break the energizing circuit of the electromagnet 30 when the contact 17 engages contact 22.

In Fig. 3 is shown a different means for advancing a measuring disk 18'. An electric motor 46 is connected to be energized from the supply conductor A upon the contact 17 on the shaft 8 engaging a contact member 22'. The energizing circuit for the motor includes the upper conductor A, conductor 16', shaft 8, contact 17, contact 22', conductor 32', motor 46, and conductor 36' to lower supply conductor A. The disk 18' is provided with gear teeth as shown at 47, and is adapted to be driven in a clockwise direction by means of a pinion 48 driven by the motor 46. A slip gear 50 engages the disk 18' to prevent movement in the reverse direction.

With this particular type of driving means, it will appear that the disk 18' will be driven only when the current through the load circuit is sufficient to bring the contact member 17 into engagement with the contact 22'. Upon such engagement occurring, the motor 46 will operate to rotate the disk 18' until contact 22' is out of engagement with the movable contact. Since the contact 17 is thus free to move backward toward its zero point at any time, it will be evident that the position of the shaft 8 will not indicate the peak demand. For this reason an indicator member 51 is disposed on the disk 18' to indicate its rotary position relative to a scale 52.

In the modification of the invention shown in Fig. 4, a relay member 54 is provided for energization in proportion to the current flowing in the supply circuit A by means of the current transformer 4'. Disposed in parallel circuit arrangement with an operating coil 55 of this relay is an adjustable resistor 56. An arm member 57 for adjusting the value of this resistance is disposed on a rotatable ratchet wheel 58 to move therewith.

The armature of an electromagnet 60 is biased to a downward position by means of a spring 62 and has associated therewith a winding 63 for attracting it upwardly against the spring. The armature includes a pawl member 64 adapted to engage notches 66 upon the ratchet wheel 58 to rotate the wheel and accompanying resistor arm 57 upon each movement from unenergized to energized position. As shown in the drawing, this movement will be in a counter-clockwise direction and will serve to decrease the resistance of the resistor 56. The energization of the electromagnet 60 is controlled by means of a switch 68 which forms part of the relay 54 and is operated by the electromagnet 55 thereof.

In this modification of the invention, the device is initially set with the resistance 56 adjusted to substantially its highest value. The resistance of the shunt circuit about the energizing coil 55 will then be such that a current of a relatively low peak value in the conductor A will be sufficient to energize the coil 55 and thus close the switch 68. As previously described, the closure of the switch member will cause the pawl 64 to advance the ratchet 58 one notch in a counter-clockwise direction, and thus move the arm 57 to reduce the resistance of the resistor 56 a predetermined amount. With this resistance at a lower value than previously, a larger proportion of the energizing current from the transformer 4' will pass through the shunt circuit, and, consequently, a higher load current will be necessary to bring about the next actuation. In this manner, the resistance of the shunt circuit will be progressively decreased and will furnish an indication of the maximum peak demand which has occurred during a billing period. If desired, a scale 70 may be provided for cooperation with the arm 57.

It will be apparent that the present invention provides a maximum peak demand meter in which the measuring device may be made particularly accurate since it serves only for this purpose, and is not required to supply the energy for the notching operation. While the invention has been described with reference to a measurement of the current value of the maximum peak demand, it will be obvious that some other electrical characteristic of the intermittent load might be used for this purpose. For example, instead of using an ammeter device, such as is described in Fig. 1, a wattmeter might be employed to furnish rotative movement to the shaft 8 and moving contact 17, as shown therein. The energy for operating the electromagnets may be supplied through transformers or from some source other than the supply conductors, if preferred.

Since the above and various other modifications may be made in the apparatus as shown and described without departing from the spirit and scope of the invention, it is intended that it shall be limited only by the following claims interpreted in view of the prior art.

We claim as our invention:

1. A peak demand meter comprising an armature biased in one direction, an electromagnet for attracting said armature in opposition to said bias, an electrical circuit for energizing said electromagnet, means energized in accordance with the current in an electrical circuit to be metered for controlling the continuity of said energizing circuit, said last named means including a member movable in a predetermined direction for increasing the load current required to cause operation thereof to change the condition of continuity of said energizing circuit, means driven by said armature for advancing said movable member in said predetermined direction upon operation of said control means, and means for indicating the position of said movable member.

2. A peak demand meter comprising an armature mounted for reciprocating motion, means for biasing said armature toward one end of its path of motion, an electromagnet for attracting said armature in opposition to said biasing means, an electrical circuit for energizing said electromagnet, a switch for controlling said energizing circuit, means energized in accordance with the current in an electrical load circuit to be metered for operating said switch, said switch operating means including a member movable in a predetermined direction to increase the load current required to cause operation thereof, means for transmitting the motion of said armature resulting from said operation of said switch to advance said movable member in said predetermined direction, and means for indicating the position of said movable member.

3. In a device for measuring the maximum peak demand of an electrical load circuit, an armature mounted for reciprocating movement, means for biasing said armature toward one end of its path of motion, an electromagnet for attracting said armature to the opposite end of its path of motion, an electrical circuit for energizing said electromagnet, a switch for controlling said energization circuit, means energized in proportion to the current in said load circuit for operating said switch, said switch operating means including a member mounted for rotation in a predetermined direction to increase the load current required to cause operation of said switch from a first position to a second position, means for transmitting the motion resulting from said operation of said switch to advance said rotatable member in said predetermined direction, and means for indicating the position of said movable member.

4. A peak demand meter comprising an electro-responsive device, means for energizing said electro-responsive device with a current proportional to an electrical characteristic of a load circuit, said energizing means including an adjustable impedance for changing the ratio of said energizing current to said electrical characteristic, means for adjusting said adjustable impedance upon each actuation of said electro-responsive device to increase the magnitude of said electrical quantity necessary to cause a subsequent actuation thereof, and means for indicating the adjustment of said impedance.

5. A peak demand meter comprising an electro-responsive device which is actuated upon the passage of a predetermined current therethrough, means for energizing said electro-responsive device with a current proportional to the current in a load circuit, said energizing means including an adjustable impedance for changing the ratio of said energizing current to said load current, means for adjusting said adjustable impedance upon each actuation of said electro-responsive device to increase the magnitude of said load current necessary to cause a subsequent actuation thereof, and means for indicating the adjustment of said variable impedance.

6. A peak demand meter comprising an electro-responsive device which is actuated upon the passage therethrough of a current exceeding a predetermined value, means for energizing said electro-responsive device with a current proportional to the current in a load circuit to be metered, said energizing means including an adjustable resistance for changing the ratio of said energizing current to said load current, means for adjusting the value of said adjustable resistance upon actuation of said electro-responsive device to increase the magnitude of said load current necessary to cause a subsequent actuation thereof, and means for indicating the adjustment of said variable resistance.

7. A peak demand meter comprising an electro-responsive device which operates upon the passage of a predetermined current therethrough, means for energizing said electro-responsive device with a current proportional to the current in a load circuit, said energizing means including an adjustable impedance in shunt relationship with said electro-responsive device for changing the ratio between the current passing through said device and said load current, means for decreasing the value of said adjustable impedance upon operation of said electro-responsive device to increase the magnitude of said load current necessary to cause a subsequent operation of said device, and means for indicating the adjustment of said variable impedance.

8. A peak demand meter comprising a device operable upon the passage of a current of predetermined magnitude therethrough to control the continuity of an electric circuit, means for energizing said control device with a current proportional to the current in a load circuit, said energizing means including an adjustable impedance for changing the ratio of said energizing current to said load current, an electrical circuit the energization of which is controlled by said control device, an electro-responsive device in said controlled circuit for changing the value of said adjustable impedance upon each operation of said control device to increase the magnitude of said load current required for a subsequent operation of said control device, and means for indicating the adjustment of said variable impedance.

9. A peak demand meter comprising an armature mounted for reciprocating motion, means for biasing said armature toward one end of its path of motion, an electromagnet for attracting said armature in opposition to said biasing means, a circuit for energizing said electromagnet, a switch device operable from a normal position to a second position upon the passage of a predetermined electric current therethrough to control the continuity of said energizing circuit, means for energizing said switch device with a current proportional to the current in a load circuit, said energizing means including an adjustable impedance for changing the ratio of the current energizing said switch device to said load current, and means for transmitting the motion of said armature resulting from the operation of said device to increase the magnitude of said load current required for a subsequent operation of said control device.

10. A peak demand meter comprising a first contact member adjustable in a predetermined path, a second contact member normally in engagement with said first contact member but movable along said predetermined path a distance proportional to the load current in a circuit to be metered to separate therefrom upon said load current exceeding the value represented by its position when in such engagement, an electromagnet having an armature biased to a retracted position and movable to an attracted position when the electromagnet is operatively energized, means for operatively energizing said electromagnet through said contact members, means for advancing said first contact member upon each movement of said armature to retracted position to increase the magnitude which said load current must reach to cause a subsequent separation of said contact members, and means for indicating the position of said first contact.

11. A peak demand meter comprising a member mounted for rotary movement, a pair of spaced contact members mounted on said rotatable member, a third contact member normally in engagement with the first of said pairs of contact members but rotatable along a predetermined path a distance proportional to an electrical characteristic of a load circuit to separate therefrom and approach the second of said pairs of contact members upon said electrical characteristic exceeding the value represented by its position when in such engagement, an electromagnet having an armature held to an attracted position when the electromagnet is operatively energized and movable to a retracted biased position when it is deenergized, means for operatively energizing said electromagnet continuously when said third and first contact members are in engagement, means for operatively energizing said electromagnet intermittently when said third and second contact members are in engagement, means for advancing said rotatable member upon each movement of said armature to retracted position to increase the magnitude which said electrical characteristic must reach to cause a subsequent deenergization of said electromagnet, and means for indicating the position of said rotatable member.

12. A peak demand meter comprising a member mounted for rotary movement, a pair of spaced electrical contacts mounted on said rotatable member, a third electrical contact rotatable in an arc in proportion to the current in a load circuit and normally in engagement with the first of said pairs of contacts but separable therefrom to approach the second of said pair of contacts upon said current exceeding the value represented by its normal position, an electromagnet having an armature held to an attracted position when the electromagnet is operatively energized and movable to a biased position when it is deenergized, means for operatively energizing said electromagnet continuously when said third and first contacts are in engagement, a circuit including a normally closed switch and a second electromagnet for opening said switch in series arrangement with the contacts of said switch for operatively energizing said first electromagnet intermittently when said third and second contact members are in engagement, means for advancing said rotatable member upon each movement of said armature to retracted position to increase the magnitude which said load current must reach to cause a subsequent deenergization of said first electromagnet, and means for indicating the position of said rotatable member.

13. A peak demand meter comprising a member mounted for rotary movement, a pair of spaced electrical contacts mounted on said rotatable member, a third electrical contact rotatable in an arc to a position proportional to the current in a load circuit and normally in engagement with the first of said pair of contacts but separable therefrom to approach the second of said pairs of contacts upon said current exceeding the value represented by its normal position, an electromagnet having an armature held to an attracted position when the electromagnet is operatively energized and movable to a biased position when it is deenergized, means for operatively energizing said electromagnet continuously when said third and first contacts are in engagement, a stationary secondary contact, a movable secondary contact mounted on said armature to engage said first secondary contact when said armature is in said retracted position, means connected in series arrangement with said secondary contacts for operatively energizing said electromagnet intermittently when said third and second contacts are in engagement, means for advancing said rotatable member upon each movement of said armature to retracted position to increase the magnitude which said load current must reach to cause a subsequent energization of said electromagnet, and means for indicating the position of said rotatable member.

SAMUEL B. GRISCOM.
ALEXANDER C. MONTEITH.